May 15, 1923.
H. I. EATON ET AL
1,455,575
ROPE DRUM ATTACHMENT FOR TRACTORS
Filed April 19, 1921   3 Sheets-Sheet 3
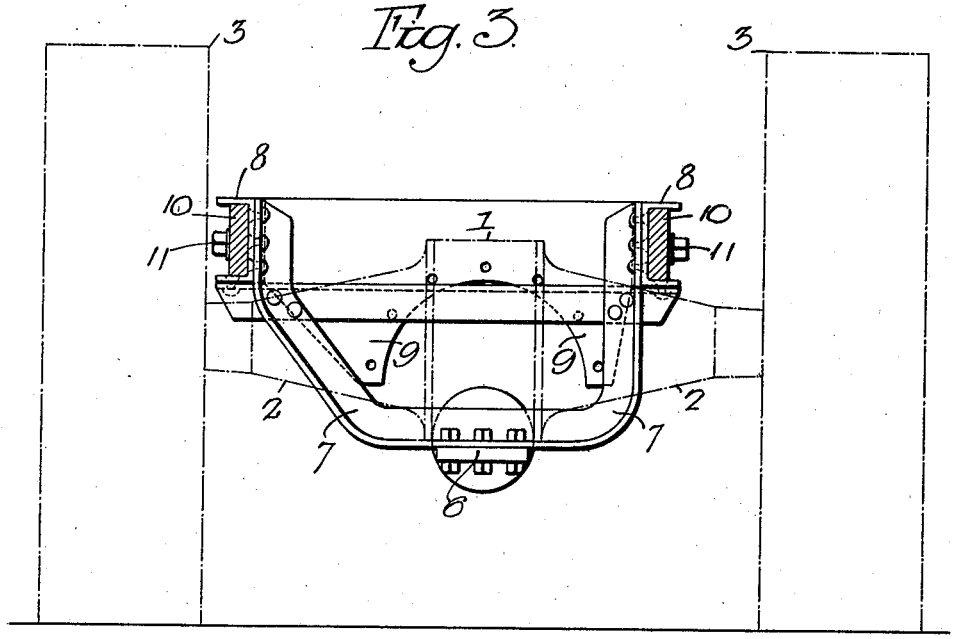
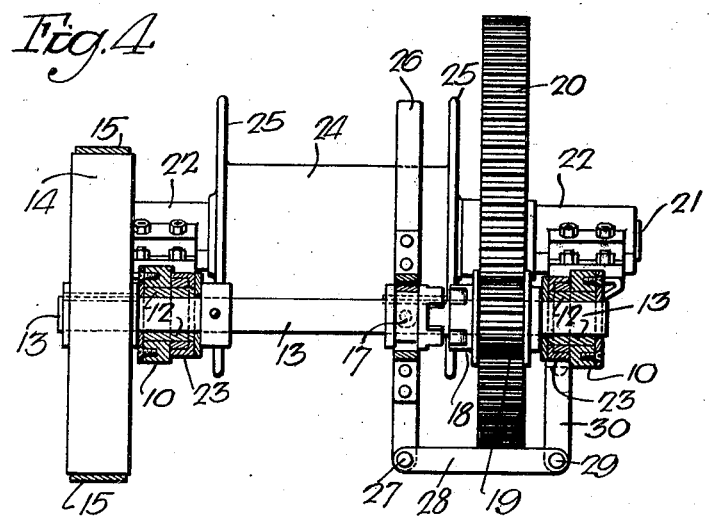
Inventors
Harold I. Eaton,
Frederick A. Reiley.
by their Attorneys.

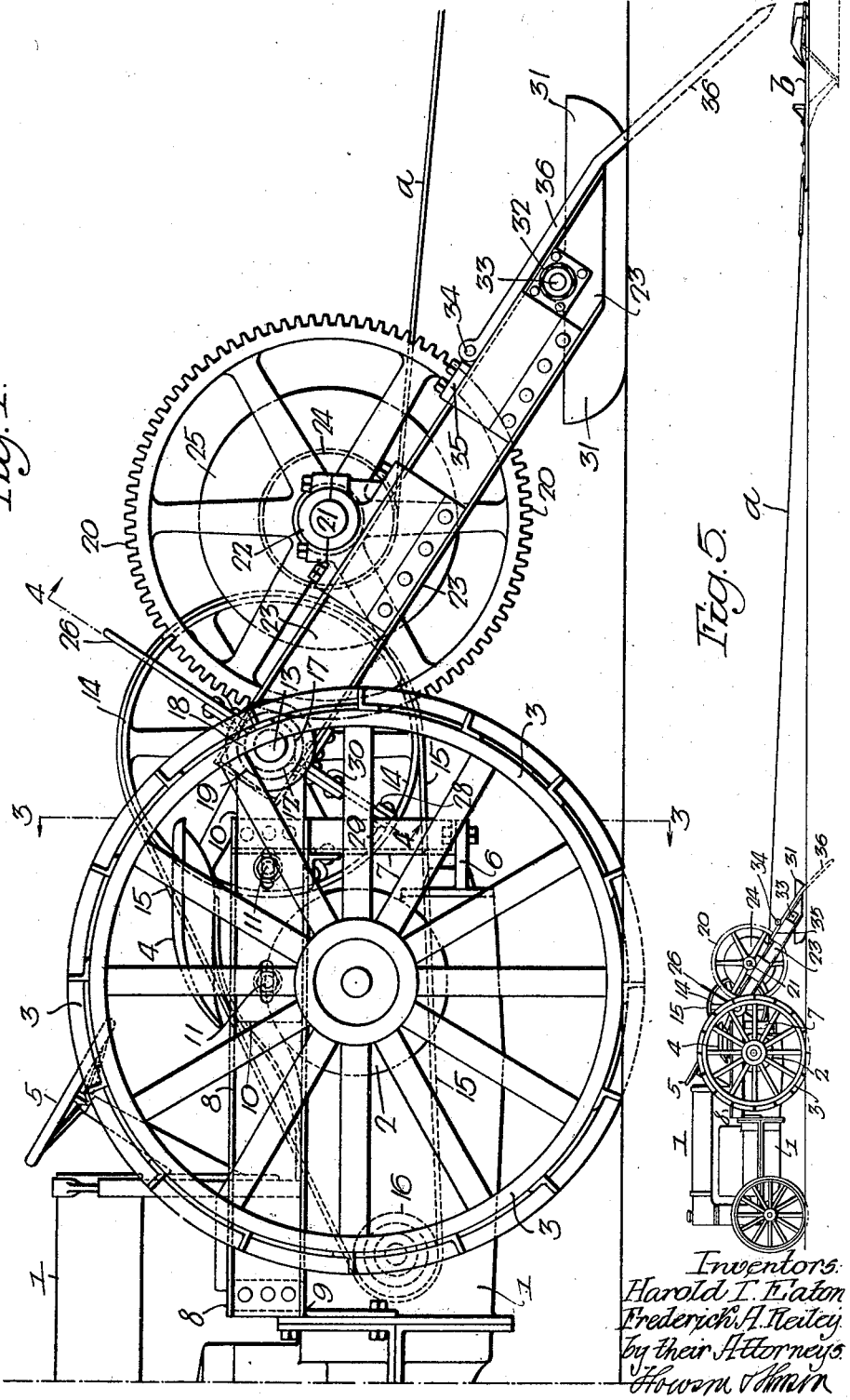

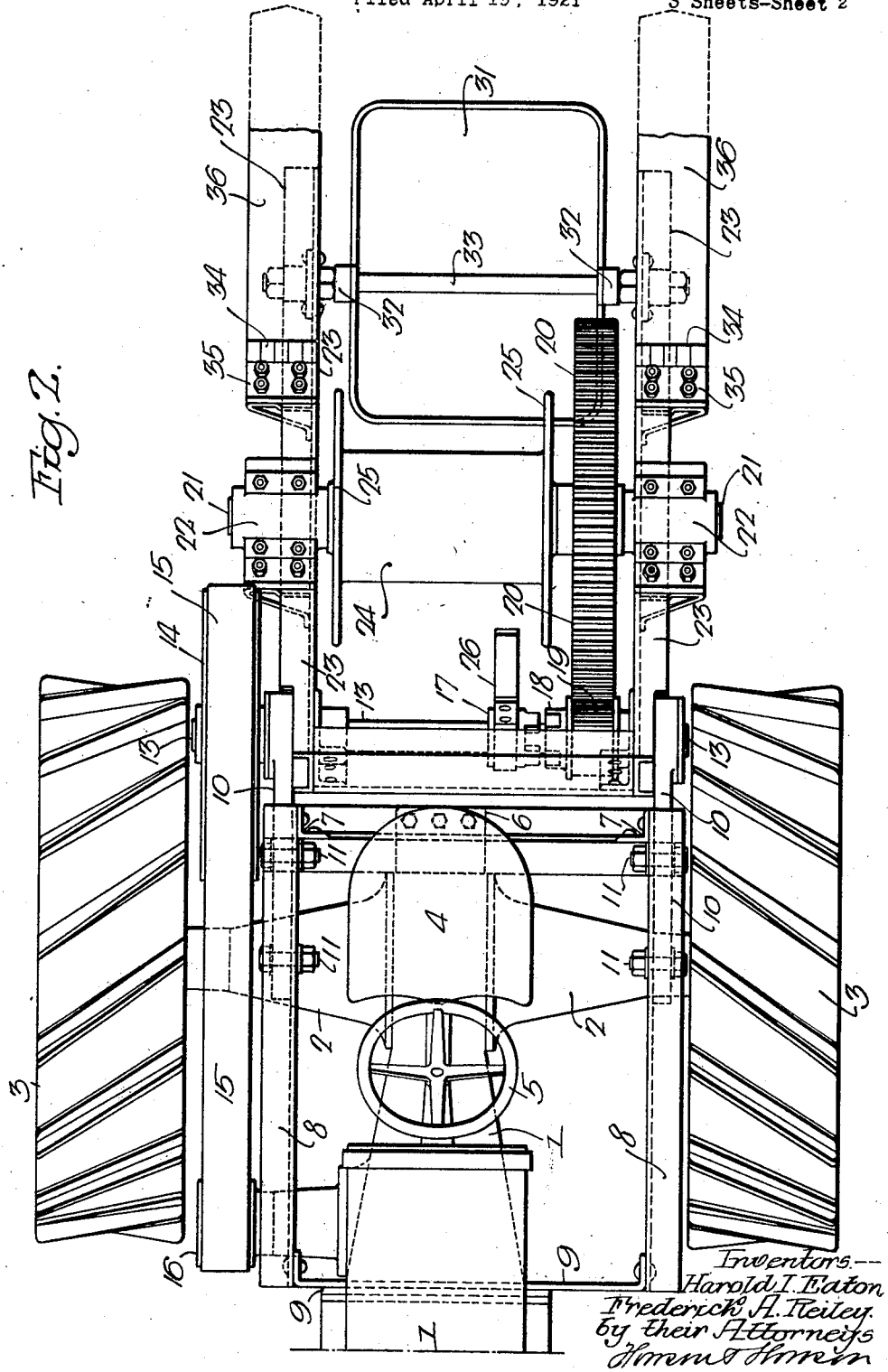

Patented May 15, 1923.

1,455,575

UNITED STATES PATENT OFFICE.

HAROLD I. EATON, OF VENTNOR, AND FREDERICK A. REILEY, OF ATLANTIC CITY, NEW JERSEY.

ROPE-DRUM ATTACHMENT FOR TRACTORS.

Application filed April 19, 1921. Serial No. 462,690.

*To all whom it may concern:*

Be it known that we, HAROLD I. EATON and FREDERICK A. REILEY, citizens of the United States, residing in Ventnor and Atlantic City, New Jersey, respectively, have invented certain Improvements in Rope-Drum Attachments for Tractors, of which the following is a specification.

The object of this invention is to provide a rope drum attachment for a tractor so that the power of the tractor can be used to rotate the drum and which can be disconnected from the power mechanism of the tractor when it is wished to move the tractor from place to place.

The invention is particularly adapted for use in connection with a ditching machine for making ditches in salt marsh where the power mechanism must be located some distance from the ditching machine, but the invention can be used for pulling stumps or for hoisting materials without departing from the essential feature of the invention.

In the accompanying drawing:

Fig. 1 is a side view of a portion of the tractor illustrating our improved rope drum attachment;

Fig. 2 is a plan view;

Fig. 3 is a sectional view on the line 3—3, Fig. 1;

Fig. 4 is a sectional view on the line 4—4 of Fig. 1, and

Fig. 5 is a diagrammatic view showing our invention as applied to a ditch plow.

1 is the body of tractor with a rear frame 2 in which are mounted the axles for the traction wheels 3. 4 is the operator's seat and 5 is the steering handle and 6 is a bracket at the rear of the tractor. Secured to this bracket is an angle bar 7 in the present instance as shown in Fig. 3 which is attached to two channel beams 8 extending forward beyond the seat and secured at 9 to any convenient place on the tractor. This forms a frame to which the rope drum mechanism is connected.

Mounted on the channel beams 8 are bars 10 which are adjustably secured thereto by means of bolts 11. These bars carry at their rear ends the bearings 12 for the shaft 13. Keyed to this shaft is a belt pulley 14 around which passes a belt 15 and this belt passes around a pulley 16 driven from the power mechanism of the tractor. Keyed to the shaft 13 is a clutch member 17 which can slide on but must turn with the shaft and this clutch member has jaws which are arranged to enter the recesses in the hub 18 of a pinion 19 which is loose on the shaft 13 and which meshes with a gear wheel 20 on a shaft 21 adapted to bearings 22 on an inclined frame 23 pivoted on the bearing bushings 12 of the shaft 13, and secured to the shaft 21 is a rope drum 24 having flanges 25 and around which the draft rope is coiled. 26 is a shifting lever for the clutch and this lever is pivoted at 27 to a link 28 which in turn is pivoted at 29 to an extension 30 on the frame 23 so that on moving the lever the clutch can be thrown into or out of engagement with the pinion. The lower portion of the frame is carried by a shoe or sled 31, which is located between the two members of the frame 23. The sled is made wide and long so as to have an extended bearing on the ground. The sled has bearings 32 which are mounted on a transverse rod 33 firmly secured to the lower portion of the frame 23, and pivoted at 34 to a bracket 35 on each member of the frame 23 is a flat stake 36 which is bent as shown in Fig. 1 and is pointed at its lower end so that while the sled rests on the ground these stakes at each side of the shoe project into the ground a sufficient distance to firmly anchor the tractor and the drum frame in position, the weight of the tractor also aiding in holding the parts in their positions.

By the above construction it will be seen that we are enabled to drive the tractor forward by its own power to a certain point and by placing the stakes in position the moment the power is applied the tractor will be drawn back to a limited extent driving the stakes into the ground and as the shoe is broad and flat it will properly support the drum frame and the tractor will be held in position while the plow is drawn forward.

As shown in the diagram Fig. 5 the drum rope *a* is attached to a ditching machine or plow *b*. These ditching machines are used particularly in cutting ditches in salt marsh where the ground is not firm but as the tractor has a comparatively large wheel base and the shoe is of a large size the tractor and the drum will be supported by the ground, and by throwing in the clutch, power is applied to turn the rope drum and coil the rope on the drum and this power is sufficient to cause the plow to cut the ditch and throw the dirt from the ditch to one side. When the plow reaches a point near the tractor then the rope drum clutch is thrown out of gear and the tractor is moved forward by its own power a sufficient distance in advance of the plow and this movement will pull the stakes out of the ground and they may trail on the ground or be lifted clear of the ground until another stop is made and then when power is again applied to the drum the stakes will be forced into the ground and the ditching plow will be moved forward, and this is repeated until the ditch has been cut to the point desired.

We claim:

1. The combination of a tractor, a frame mounted thereon, beams carried by the frame having bearings, a shaft mounted in the bearings, a drum supporting frame pivoted to the shaft and extending diagonally towards the ground, a shoe pivotally mounted on the lower end of the frame, stakes on the frame arranged to penetrate the ground; shaft bearings on the frame, a drum shaft mounted on the bearings, a drum thereon, a gear wheel on said shaft, a pinion on the first mentioned shaft meshing with the gear wheel, a clutch for throwing the pinion in engagement with the shaft, a belt wheel on the intermediate shaft, a belt wheel driven by the motor of the tractor and a belt passing around both wheels so that motion will be imparted to the belt and gearing through the drum.

2. The combination of a tractor, a frame pivoted to the tractor at the rear thereof, an intermediate shaft at the pivot, means for driving said intermediate shaft from the mechanism of the tractor, a drum shaft on the frame, a drum thereon, gearing between the drum shaft and the intermediate shaft, and a clutch through which motion is imparted to the drum shaft, a shoe for supporting the lower end of the pivoted frame and pivoted stakes mounted on the frame and arranged to extend into the ground when the mechanism is pulling a load through the medium of a rope coiled on the drum.

HAROLD I. EATON.
FREDERICK A. REILEY.